Patented Sept. 22, 1936

2,055,230

UNITED STATES PATENT OFFICE 2,055,230

PROCESS OF CANNING FISH

Edward David, Monterey, and Arno F. Schmidt, Pacific Grove, Calif.; said Schmidt assignor to said David No Drawing. Application December 30, 1930, Serial No. 505,583

5 Claims. (Cl. 99—188)

Our invention consists of a new process of canning sardines and similar fish, and has for its objects such treatment of the same that even when kept for relatively long periods of time in the cans, the fish have the appearance and flavor of those freshly caught and cooked.

The processes employed at the present time produce unfavorable results in that much of the natural taste of the fish is obscured in the unextracted oil, and other liquids, the processed fish are rendered unattractive in appearance, and the meat is left more or less tough. In our experiments we have found that the present processes do not go far enough in extracting not only the oil found in the fish, but in removing the blood, water and like impurities, all of which detract from the palatableness of the product.

With these points in mind we set about improving upon the known methods, not only with improvement of the product in mind, but with a view to effecting economies in the method of canning the fish. In the following description it is believed to be apparent that we have accomplished both of our objects.

In the first two steps of our method we do not depart from those now in practice. The fish are passed through a cutting machine which removes their heads, tails and entrails, from which they are conveyed to a tank containing a brine solution. The fish are left in the brine for several hours during which quantities of blood and similar undesirable elements are drawn off and the meat is somewhat softened.

We next pack the fish in the open cans, which are in turn filled with a brine solution. The addition of the brine at this point of our process prevents the skins of the fish from sticking to the cans during the pre-cooking step, hereinafter more fully described, which has been found to be the case when a brine solution is omitted. The cans are then placed upon a conveyor leading to a vertical steam exhaust box, or precooker, the cans entering at the bottom and emerging from the top. We have found that by using a vertical spiral exhaust box we accomplish the desired result of partially cooking the fish, extracting the oil and other liquids from the meat, with a minimum amount of steam, for the cans travelling through the upper spirals of the exhaust box obtain the benefit of the steam rising from the pipes adjacent the spiral tracks on which the cans entering the box are travelling.

As the cans emerge from the exhaust box they pass through a tilting device which drains off the liquids, including the brine previously added, and those liquids which have been extracted during the exhausting process.

The cans then travel directly into the top of a spirally fed vertical bake oven, emerging from the bottom thereof, after they have been cooked the desired length of time. In this oven we use a gas heat, since we have found it to provide the necessary dryness so essential to the complete removal of all oils and other liquids from the fish. Aided by the foregoing steps of our process, the subjecting of the fish to a dry oven heat breaks the fat cells immediately beneath the skin, permitting still further removal of non-essential oils and other liquids, and at the same time bakes the skins firmly onto the meat, thus adding to the attractiveness of our product.

As the cans emerge from the oven, they travel on an endless conveyor belt into a draining device which turns the cans upside down, in which position they move forwardly for approximately one-half minute, during which time all of the free liquids are given ample opportunity to drip.

The cans pass from this draining device to the machinery which adds the condiments or pure oil, as desired, after which they are sealed, washed and placed in a retort or high-pressure cooker, as the final step.

According to our invention we have eliminated several steps now used in the canning of fish, which have proved to be not only costly, but also to lower the standard of the quality of the product. In particular, the number of times the fish were handled in the old process, before being placed in the cans, permitted contact of the same with equipment which, if left unclean for any length of time at all, spoiled the taste of the fish. It will be noted that in our process the fish are placed in open cans immediately after they have been cleaned and washed, and they are not thereafter removed from the container.

Further, our method permits the canning of sardines as one continuous operation, rather than the present waste of many hours of valuable time while waiting for the cooled fish to dry preparatory to continuation of the process.

It will also be noted that our process provides for the complete elimination of "after taste" which occurs in the practice of the known processes, due to contamination of the fish by contact with unclean equipment and failure to remove the excess oils from beneath the skins of the fish.

Having thus described the invention, what we claim as new and desire to be protected by Letters Patent is:

1. A method of canning fish in which the fish are successively subjected to steam while in the presence of a brine solution, drained of all free liquids, subjected to a source of dry heat, and again drained of all free liquids.

2. A method of canning fish in which the fish are first placed in open cans containing a brine solution and partially cooked by steam, the cans then being drained of all free liquids, following which the fish in the open cans are subjected to a source of dry heat and again drained of all free liquids.

3. A method of canning fish in which the fish are first placed in open cans and steamed while in the presence of a brine solution, following which the cans are drained of all free liquids and successively exposed to a source of dry heat and again drained of all free liquids.

4. A method of canning fish in which the fish are cooked successively in the presence of a brine solution, drained of all free liquids, subjected to a second cooking and again drained of all free liquids.

5. In a method of treating raw fish after they have been cleaned and washed, the steps which consist in first placing the fish in open cans with a brine solution to prevent the skins of the fish from sticking to the can, then subjecting the fish to the action of steam while still in the presence of the brine solution to partially cook the fish and liberate a portion of the natural oils and moisture contained by the fish, next draining the cans of all free liquids while retaining the fish in the same, then subjecting the fish within the cans to a source of dry heat to further cook the fish, liberate additional non-essential oils and liquids and firmly set the skins onto the fish, and finally draining all free liquids from the still open cans while retaining the fish within the latter.

EDWARD DAVID.
ARNO F. SCHMIDT.